(12) United States Patent
Rizzo

(10) Patent No.: US 8,617,286 B2
(45) Date of Patent: Dec. 31, 2013

(54) METHOD FOR INCREASING CROP YIELD

(76) Inventor: John M. Rizzo, Cleveland, MS (US)

(*) Notice: Subject to any disclaimer, the term of this patent is extended or adjusted under 35 U.S.C. 154(b) by 355 days.

(21) Appl. No.: 12/909,571

(22) Filed: Oct. 21, 2010

(65) Prior Publication Data

US 2012/0096912 A1    Apr. 26, 2012

(51) Int. Cl.
*C01C 1/18* (2006.01)
*C05C 3/00* (2006.01)
*A01N 25/00* (2006.01)

(52) U.S. Cl.
USPC .................. 71/54; 71/61; 71/64.07; 71/64.11

(58) Field of Classification Search
USPC ............................................. 71/1, 31, 54–61
See application file for complete search history.

(56) References Cited

U.S. PATENT DOCUMENTS

| | | | |
|---|---|---|---|
| 3,785,796 A | 1/1974 | Mann, Jr. | |
| 4,943,308 A | 7/1990 | Vanmarcke et al. | |
| 5,330,552 A * | 7/1994 | Rizzo | 71/30 |
| 5,352,265 A * | 10/1994 | Weston et al. | 71/29 |
| 5,364,438 A | 11/1994 | Weston et al. | |
| 7,494,525 B2 | 2/2009 | Hojjatie et al. | |
| 2011/0113842 A1* | 5/2011 | Urrutia et al. | 71/23 |
| 2012/0096912 A1* | 4/2012 | Rizzo | 71/29 |

FOREIGN PATENT DOCUMENTS

| | | | |
|---|---|---|---|
| CN | 101050152 A * | 10/2007 | |
| WO | WO 2007/087180 A2 | 8/2007 | |
| WO | WO 2009/142512 A1 | 11/2009 | |

* cited by examiner

*Primary Examiner* — Jennifer Smith
(74) *Attorney, Agent, or Firm* — Richard C Litman

(57) ABSTRACT

The method for increasing yield of crop plants uses foliar application to the plants during the plant growth stage of a granular fertilizer consisting essentially of urea, ammonium sulfate and a fertilizer stabilizing agent. The stabilizing agent regulates and slows down decomposition nitrogen in urea and/or ammonium sulfate to maximize use thereof. The granular fertilizer has a urea/ammonium sulfate weight ratio of about 4/1 and contains at least 40% nitrogen and at least 4% sulfur. The relatively high N—S fertilizer is applied at relatively high rates of about 100 to 150 pounds per acre to ensure that the fertilizer nutrients are always available to the plants at several stages of growth.

5 Claims, No Drawings

METHOD FOR INCREASING CROP YIELD

BACKGROUND OF THE INVENTION

1. Field of the Invention

The present invention relates to a method for increasing the yield of crops by application of a granular fertilizer having a relatively high nitrogen and sulfur content and a stabilizer therefore. More particularly, the invention pertains to the use of nitrate inhibitors in a N—S granular fertilizer containing urea and ammonium sulfate in specific proportions to increase the yield of rice and other field crops.

2. Description of the Related Art

Rice, the cereal grass *Oryza sativa*, is one of the most important food crops cultivated throughout the world. The starchy edible seed of rice provides the principal food for millions of people whose diet depends on its availability. The continued increase of the world's population and concomitant food shortage increase the need for improvements in the production of this staple crop.

The proportion of rice grown in the United States relative to worldwide rice production is small but is steadily increasing, especially in Texas, Mississippi, Louisiana, Alabama and Tennessee. Recent increased cultivation of rice in the southern USA may be attributed to the widespread use of herbicides and pesticides, which are utilized to eliminate unwanted weeds and insect pests. Unchecked weed growth, for example, can cause a significant decrease in crop yield and reduce profits for the farmers. However, it can be appreciated that extensive use of herbicides and pesticides increases the overall crop production costs and undesirably affects water quality and wildlife. In some areas, water from rice farms treated with pesticides is discharged into other bodies of water to create environmentally unsafe conditions. In fact, legislation has been enacted in some of the southern states to control discharges of water from such chemically treated areas and to reduce or eliminate the use of these environmentally hazardous chemicals.

The conventional method of producing paddy rice in the United States is to aerially broadcast the rice seed over pre-cultivated and pre-flooded paddies. The rice paddy is normally flooded to a water level of one to four inches in depth prior to planting. Alternatively, a standard grain drill may be used plant rice seeds into the upper section of the soil, prior to irrigation flushing or flooding with water. The water level is maintained throughout the growing season, except for brief periods when the paddy is drained to allow any required herbicide or pesticide treatment. After germination and emergence of the seedlings, the rice plants grow above the water level in the paddy. These procedures can be modified by soil cultivation after planting, transplantation of rice seedlings and by deeper flooding, which significantly reduce the use of herbicides and pesticides.

Currently, after planting and before germination, a fertilizer is usually applied to the rice paddy, either aerially or with equipment pulled by tractors. A nitrogen-containing fertilizer in amounts of 100 units or more per acre is generally incorporated into the soil. A starter fertilizer containing phosphorus is also often used. In former years, natural fertilizers such as manure composts were used in rice farming, but a reduced yield usually resulted and regulation of the harvest time was difficult to achieve. Over the years, urea (46% N, 0% S), monoammonium phosphate (12% N, 61% $P_2O_5$, 0% S), diammonium phosphate (21% N, 52% $P_2O_5$, 0% S), triple superphosphate (46% $P_2O_5$, 0% S), triple superphosphate (46% $P_2O_5$, 0% S) and various N—P—K solutions have been tried for fertilization of rice crops. However, these sulfur-free fertilizers fail to replenish the sulfur content of the soil removed with each harvest of the rice crop. The S-nutrient content of the soil is also lost from leaching-out processes that occur during preparation of the rice paddy. The end result is a serious shortage of sulfur in the soil, which is harmful to the rice crop. Further, nitrogen-free dressings of superphosphate (20% $P_2O_5$, 12% S) are ineffective by themselves for sustaining crop growth and generally provide the soil with more sulfur than is needed for growing rice. A better supplier of sulfur is ammonium sulfate (21% N, 24% S) since the sulfur is available in a form that can be readily taken up by the rice plant. However, nitrogen-containing ammonium sulfate, by itself, is ineffective for fertilizing purposes by reason of its low nitrogen content and relatively high sulfur content. Moreover, the nitrogen conversion may be too rapid for the soil to absorb.

While many such natural and synthetic materials are known in the prior art for fertilization of field crops, there remains an important need for the development and application of selective fertilizers which are not only effective in artificially initiating and sustaining rice crop growth, but increasing the yield of this important food crop by the efficient release of chemicals to be absorbed by the soil.

My prior patent, U.S. Pat. No. 5,330,552, disclosed an effective method for increasing crop yield. Nevertheless, there is a need to improve the fertilization method by extending the period during which nitrogen is available for use by the growing crop.

Thus, a method for increasing crop yield solving the aforementioned problems is desired.

SUMMARY OF THE INVENTION

The method for improving the yield of field crops, especially rice, involves application of a stabilizing agent to a selective granular fertilizer that contains sufficient nitrogen and sulfur to initiate and sustain the growth of plants, particularly rice.

A method for growing and fertilizing rice is provided that will result in satisfactory rice yields and yet eliminate or reduce the use of environmentally hazardous herbicides and pesticides.

A method of growing paddy rice is provided through applying the resultant selective fertilizer at relatively high rates during particular plant growth stages to make the fertilizer more readily available to the plant at times when fertilizer nutrients can be used to fullest advantage.

The method for increasing the yield rice comprises applying during the plant growth stage at relatively high rates a granular fertilizer consisting essentially of urea and ammonium sulfate in a urea/ammonium sulfate weight ratio of about 4/1 and a stabilizing agent that slows conversion of nitrogen in urea into ammonia. The fertilizer product employed according to the present method contains at least 40% nitrogen, at least 4% sulfur, and effective amounts of N—(N-butyl) thiophosphoric triamide (NBPT) or dicyandiamide (DCD) to stabilize the urea. Preferably, the product contains from about 40% to 42% nitrogen and from about 4% to 5.5% sulfur. The most preferred formulation is 41-0-0-4S, which indicates a product grade containing 41% nitrogen, no phosphorus, no potassium, and 4% sulfur.

The rate of foliar application of the fertilizer useful in the present invention is about 100 to 150 pounds per acre. This application rate is relatively high compared to that usually employed for fertilization of rice crops, so as to ensure that the fertilizer nutrients are always available to the rice plants at several stages of their growing period. As referred to therein, the "growing period" is understood to mean the rice growth period normally from emergence to ripening of the rice crop in the form of grains or before the flowering stage.

These and other features of the present invention will become readily apparent upon further review of the following specification.

DETAILED DESCRIPTION OF THE PREFERRED EMBODIMENTS

The urea-ammonium sulfate fertilizer granules employed in the method for increasing the yield of crops may be prepared by procedures well known in the art. The two components may be combined as a solution or melt in a urea/ammonium sulfate weight ratio of about 4/1 and then granulated and/or prilled at elevated temperatures. The product granules should have good mechanical characteristics and contain a homogeneous dispersion of very finely divided ammonium sulfate in urea containing from 40% to 42% nitrogen, no phosphorus or potassium and from 4% to 5.5% sulfur. Also, they should have a smooth, round surface, not exhibit any tendency to cake under humid conditions, and be readily capable of dispersion by aerial application or conventional ground equipment. The preferred grade fertilizer for purposes of the present invention is a 41-0-0-4S composition.

As noted above, the timing and rate of application of the selective fertilizer are added significant factors in achieving the increased rice yields of the present invention. The are approximately 21 weeks from planting to harvest of rice crops, and about 14 weeks in which the rice fields remain flooded. The initial application of fertilizer at a rate of about 100-150 pounds per acre is generally made about 204 weeks after planting or when the rice plants reach an average height of about three to four inches. Conveniently, this initial application is accomplish one to three days before permanent flooding. After about a 10-14 day interval, a second application of the fertilizer is made to the flooded rice paddy. This procedure continues until a total of about 400 to 600 pounds per acre of the fertilizer is applied to the rice plants during various stags of their growing period. Preferably, four applications of the fertilizer are made, with 10 to 12 days elapsing between each application. The rate of each application is about 125 pounds per acre, for an aggregate of 500 pounds of fertilizer being applied to the rice field. The final application is preferably applied just before (1-3 days before) the rice enters the flowering stage. Generally, no significant yield improvements result if the fertilizer is applied after the rice enters the flowering stage.

In order to eliminate or reduce the use of pesticides or herbicides during the growing season, the rice field is deep flooded (3-6 inches or more of water) and kept flooded until prior to harvest. Also, a cultivator, which is capable of removing weeds without damaging the rice plants, can be used before final flooding.

Application may be by any conventional means that provides uniform dispersal of the fertilizer granules such as a tractor-drawn spray system or other conventional ground or serial application system. Since the rice paddy remains flooded during most of the season, aerial application of the fertilizer by airplane is preferred.

The following example demonstrates an exemplary way of carrying out the method, but is not intended to be limiting in any way. All parts and percentages are designated by weight unless otherwise indicated.

EXAMPLE

In spring, rice was planted in Cleveland, Miss. after preparation of the seedbeds by plowing and leveling the field by triplaning. A grain drill is used to plant 100 pounds of rice seed per acre at a depth of two inches into the soil. After planning, the field is flush-irrigated and drained. Three weeks after planting, when the rice plants are 3-4 inches in height, weed seedlings also begin to emerge from the soil and cultivator is used to remove these weed plants. After cultivation and one day before flooding, granular urea/ammonium sulfate fertilizer (grade 41-0-0-4S) was aerially applied to the field at a rate of 125 pounds per acre. The entire field was then flooded to a water level of four to six inches and five weeks after planting, a second application of 41-0-0-4S fertilizer is aerially applied to the flooded rice paddy from an airplane at a rate of 125 pounds per acre. The field remained flooded throughout the growing season, during which a third and fourth application of 41-0-0-4S fertilizer (125 pounds/acre) was dispersed at two-week intervals, for a total of 500 pounds per acre of applied fertilizer. Approximately ten weeks after the final application of fertilizer, the rice crop is harvested to yield 151 bushels of dry rice per acre. The average yield for farm fields in the county using conventional rice growing methods that same year was only about 130 bushels per acre.

The results set forth hereinabove demonstrate a substantial rice yield increase by post-emergence application of the selective fertilizers utilized in the method for increasing the yield of crops. While the above urea-ammonium sulfate fertilizer is beneficial for increased yield, the efficiency of the urea-ammonium fertilizer may be increased by application of a stabilizing additive.

One of the preferred fertilizer stabilizing agents is NBPT or N—(N-butyl) thiophosphoric triamide. NBPT is a urease enzyme inhibitor that slows down conversion of urea nitrogen to ammonium nitrogen. In many cases, such conversion is usually too rapid for the soil to absorb. As a result, about 30% of the nitrogen can be lost through volatilization of ammonia, even in liquids injected into the ground. In application, the NBPT would be more suitable as an additive for the urea in the above fertilizer, since the ammonia sulfate is already a very stable component. For example, in using the above urea-ammonium sulfate fertilizer without the fertilizer stabilizing agent, it has been found that urea breaks down in about week while the ammonium sulfate lasts for about four weeks.

Another example of a preferred stabilizing agent is DCD or dicyandiamide. DCD is a nitrification inhibitor. DCD can slow nitrification of ammonia nitrogen into nitrate by about 80%. Since the DCD decreases the rate of nitrification of most components, DCD can be applied to both the urea and ammonium sulfate component of the above fertilizer. As an alternative to the above, both the NBPT and DCD may be applied to the fertilizer.

Thus, it can be seen that the fertilizer stabilizing agent provides a more controlled and therefore efficient consumption of nitrogen by the plants. Similar trials with various crops other than that specifically illustrated seem to indicate that similar beneficial results may be also be attained by the practice of the invention on such useful crops as corn, wheat and soybeans, to name a few. Therefore, those skilled in the art will appreciate that various changes and modifications can be made from the specific teachings of the present disclosure without departing from the spirit of the invention. Accordingly, it is to be understood that the present invention is not limited to the embodiments described above, but encompasses any and all embodiments within the scope of the following claims.

I claim:

1. A method for increasing the yield of rice plants comprising the steps of applying to the plants during the rice plant growth stage a granular fertilizer consisting essentially of urea, ammonium sulfate in a urea/ammonium sulfate weight ratio of about 4/1, at a rate of about 100 to about 150 pounds per acre, and an effective amount of a fertilizer stabilizing agent added thereto to slow down nitrogen production, wherein the fertilizer stabilizing agent consists of a mixture of a urease inhibitor applied to the urea and a nitrification inhibitor applied to both the urea and the ammonium sulfate, wherein the urease inhibitor consists of N—(N-butyl) thiophosphoric triamide and the nitrification inhibitor consists of dicyandiamide.

2. The method according to claim 1, wherein said granular fertilizer has a grade analysis of 41-0-0-4S.

3. The method according to claim 1, wherein the rice plant growth stage includes a period from emergence in a field to ripening.

4. The method according to claim 1, wherein the rice plant growth stage comprises a period before the rice enters the flowering stage.

5. The method according to claim 1, wherein the fertilizer is applied at a rate of about 125 pounds per acre by aerial application.

* * * * *